May 28, 1935.　　G. E. MIRFIELD ET AL　　2,003,118
ELECTRIC WELDING APPARATUS
Filed March 22, 1933　　10 Sheets-Sheet 2

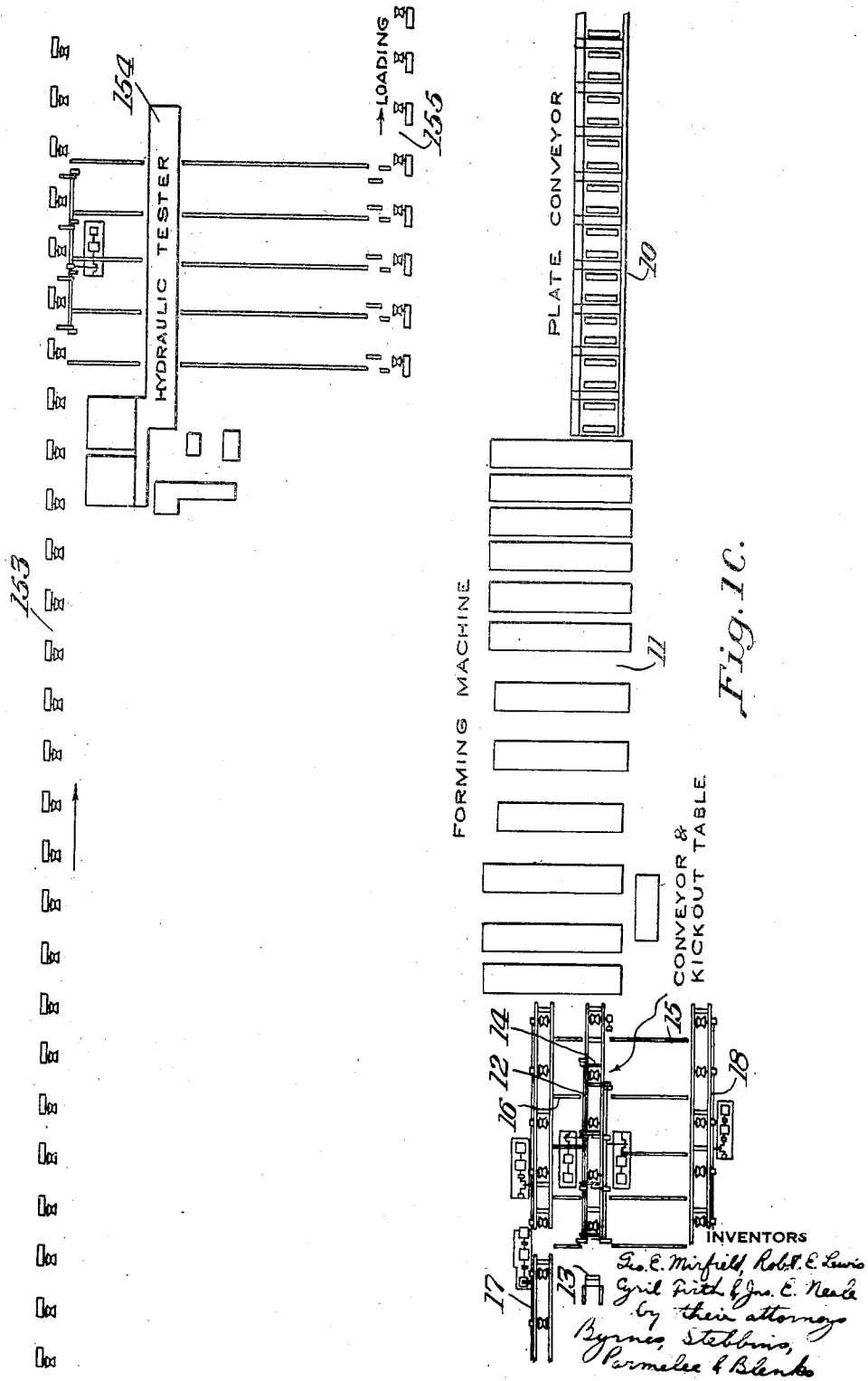

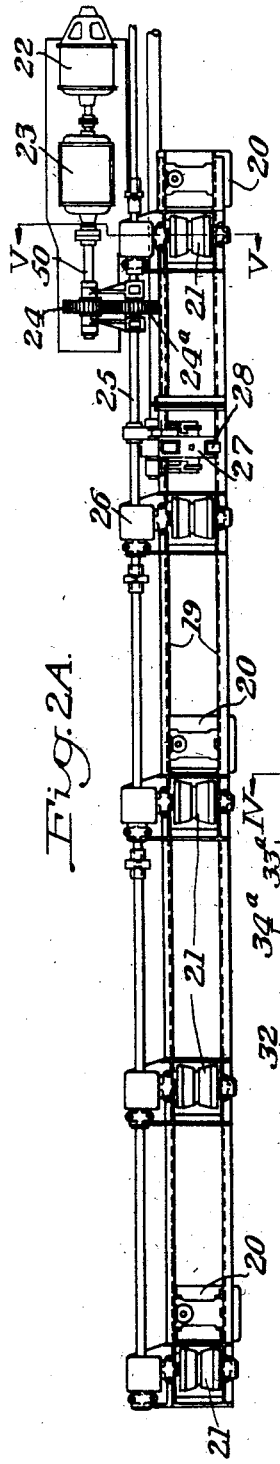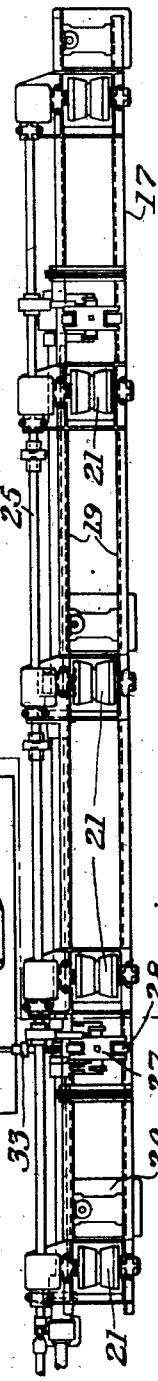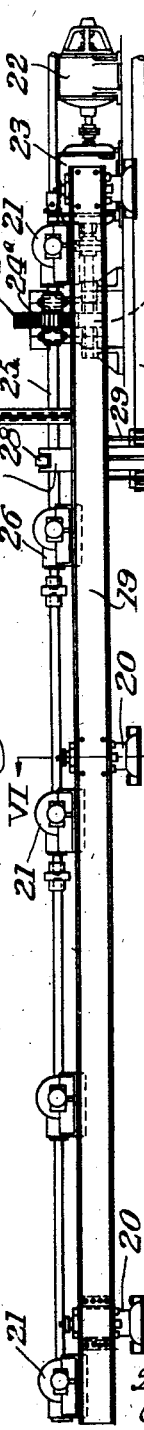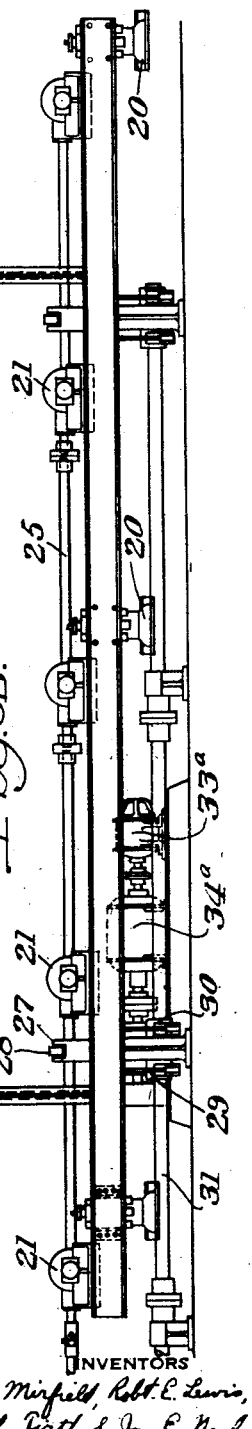

May 28, 1935. G. E. MIRFIELD ET AL 2,003,118
ELECTRIC WELDING APPARATUS
Filed March 22, 1933 10 Sheets-Sheet 5
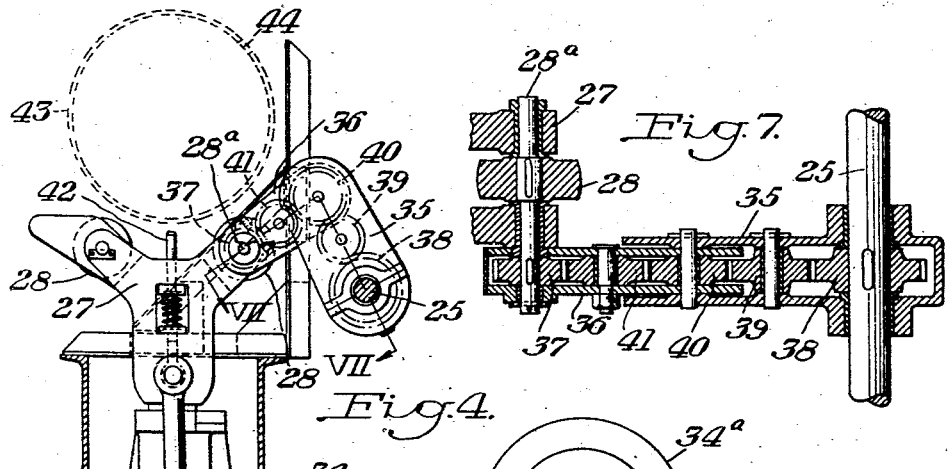
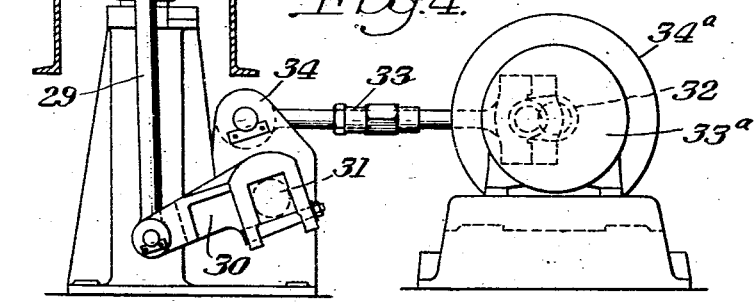
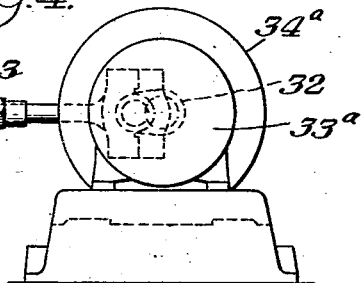
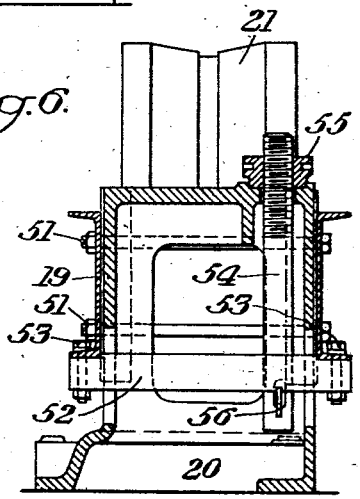
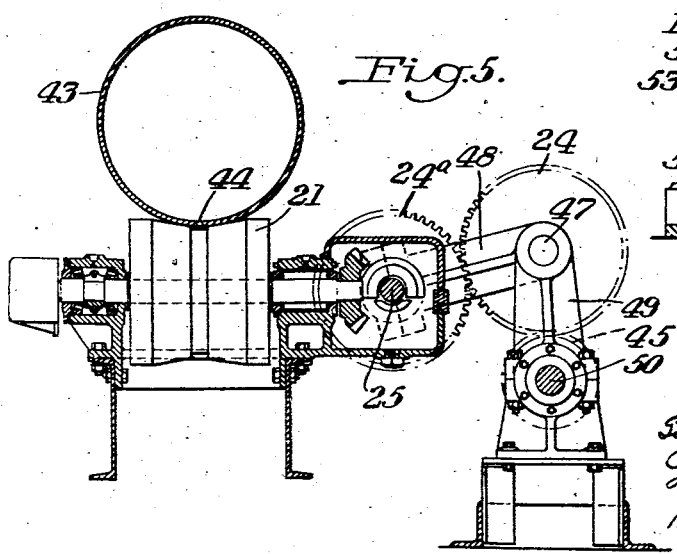

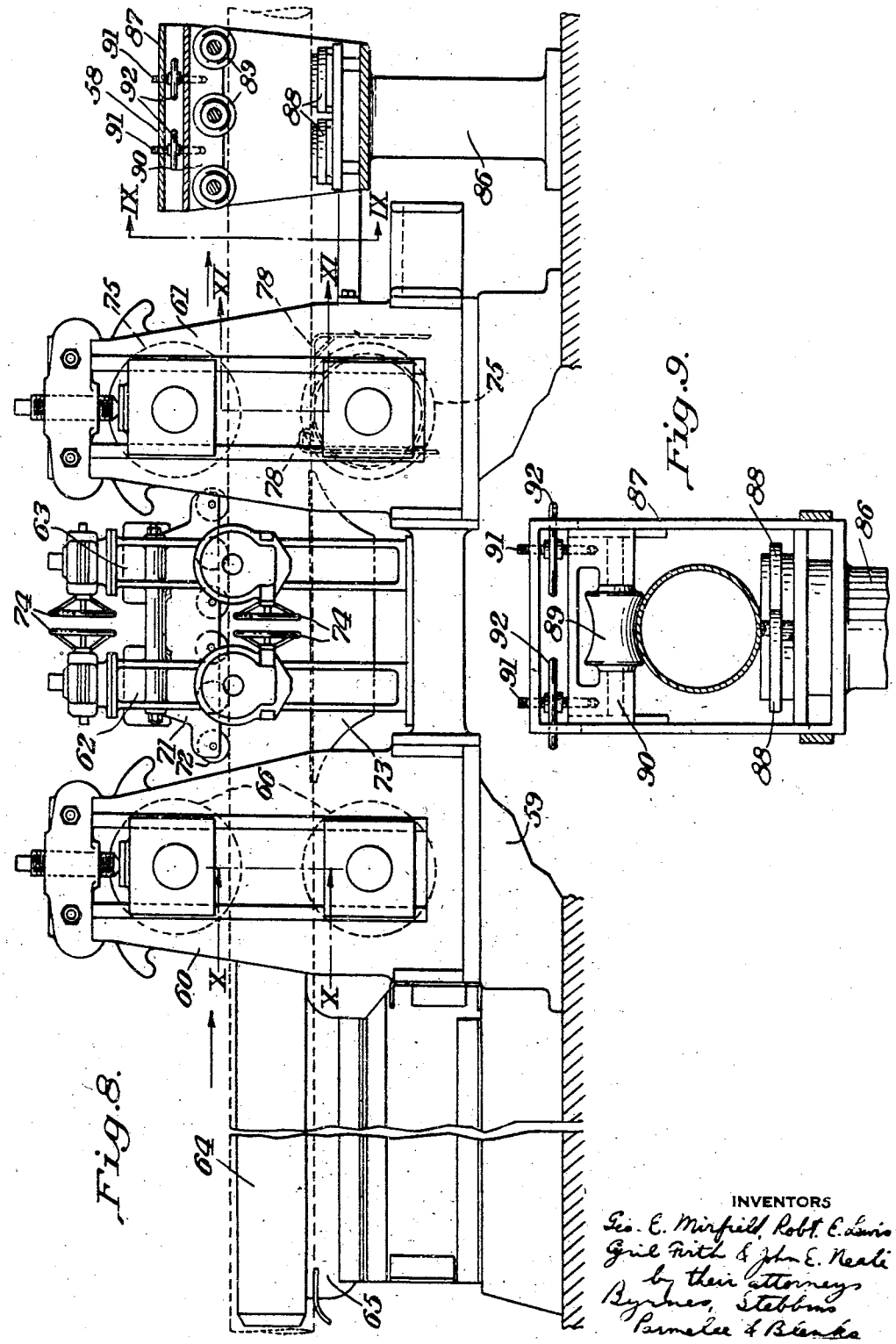

May 28, 1935.  G. E. MIRFIELD ET AL  2,003,118
ELECTRIC WELDING APPARATUS
Filed March 22, 1933  10 Sheets-Sheet 7
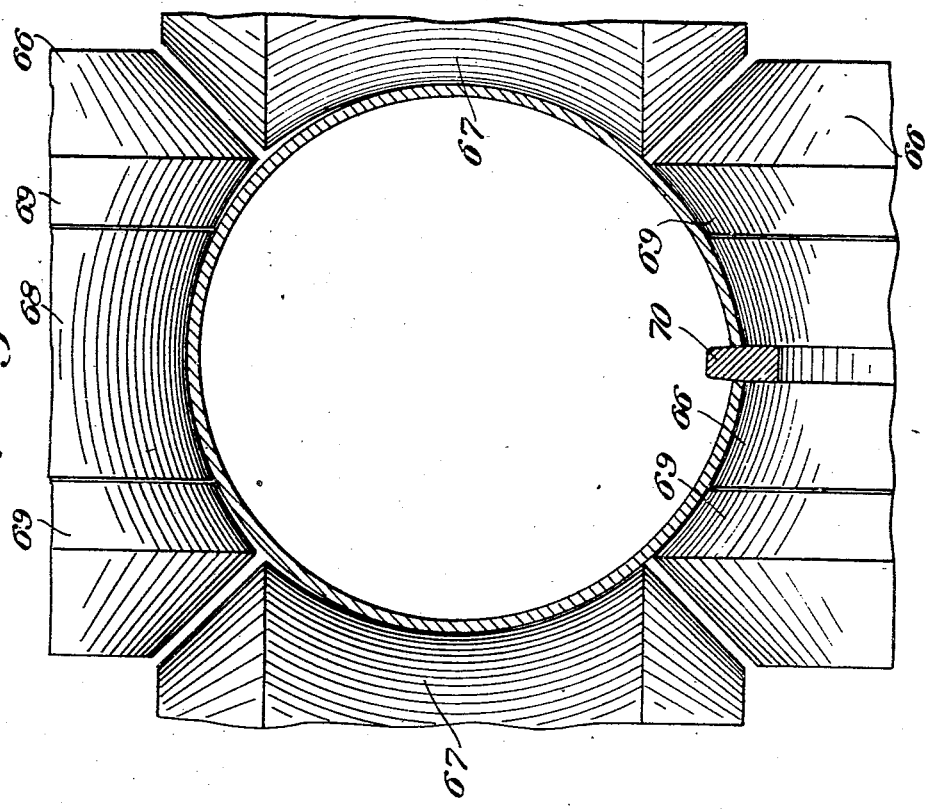
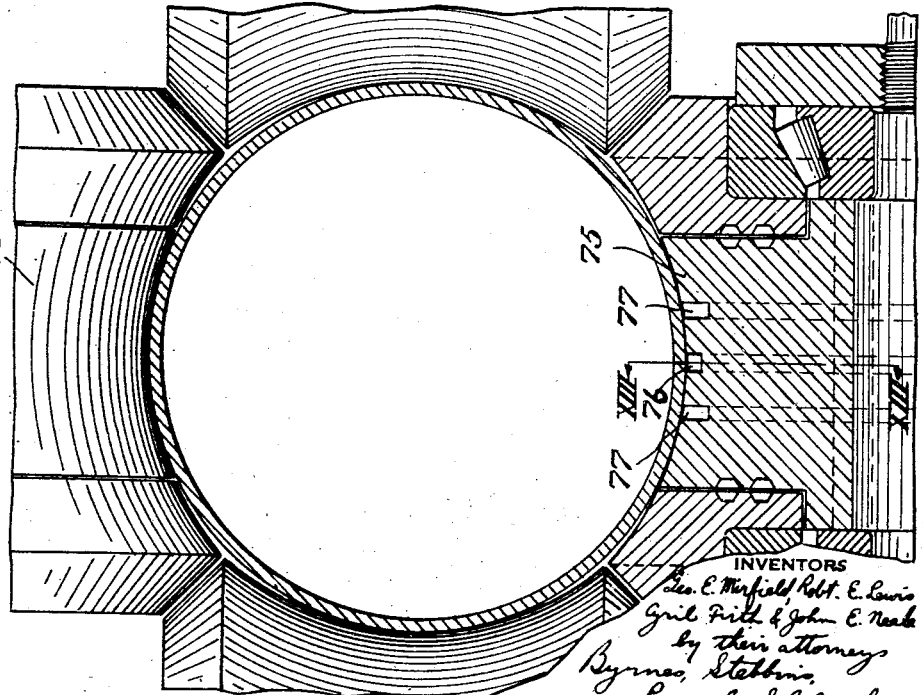

May 28, 1935.    G. E. MIRFIELD ET AL    2,003,118
ELECTRIC WELDING APPARATUS
Filed March 22, 1933    10 Sheets-Sheet 8
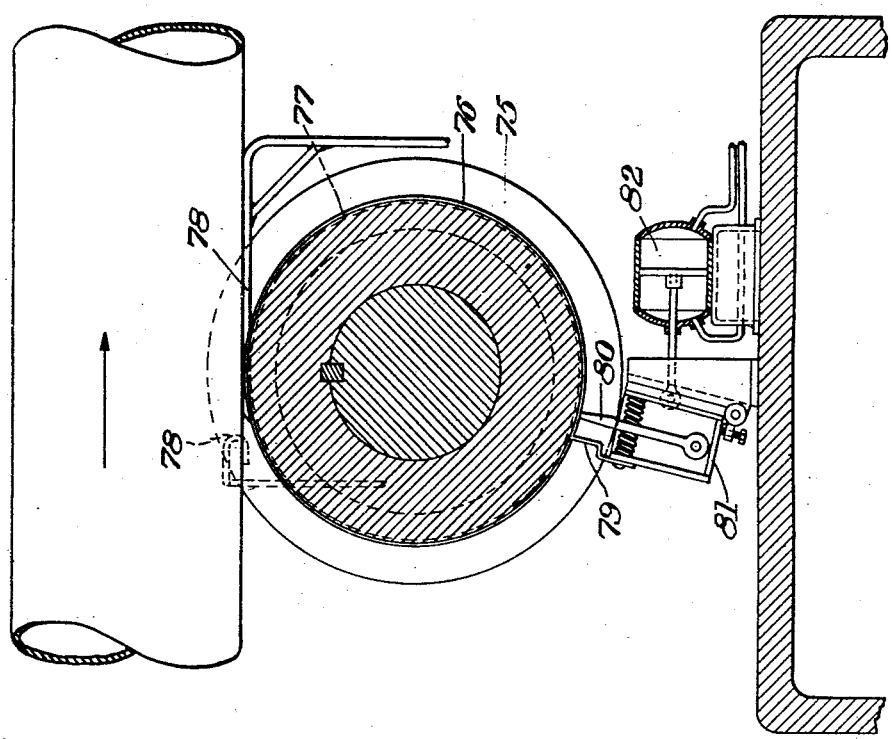
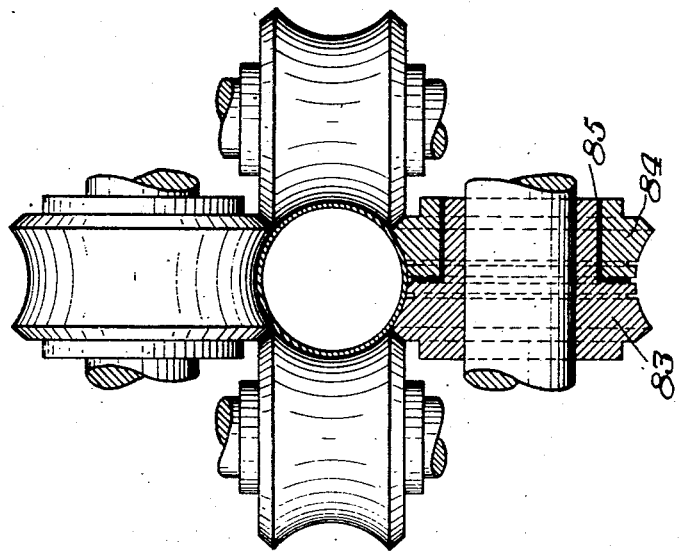
INVENTORS
Geo. E. Mirfield, Robt. E. Lewis
Cyril Firth & John E. Neale
by their attorneys
Byrnes, Stebbins, Parmelee & Blenko

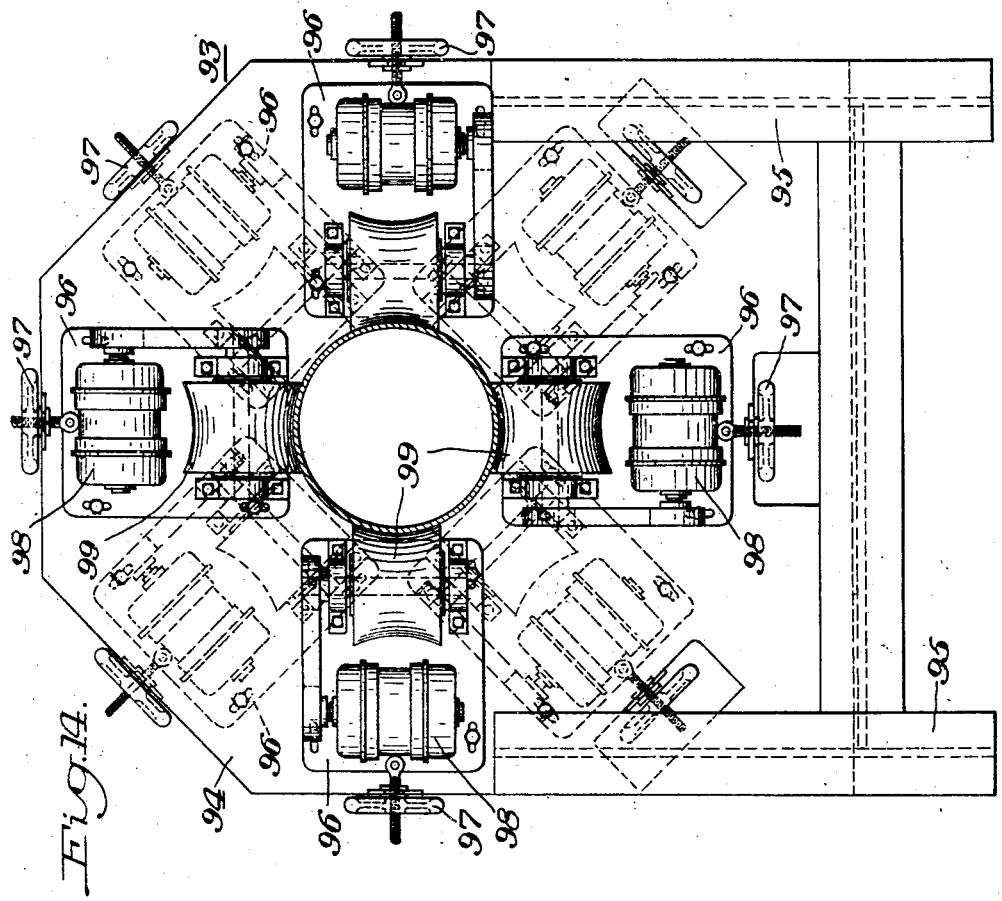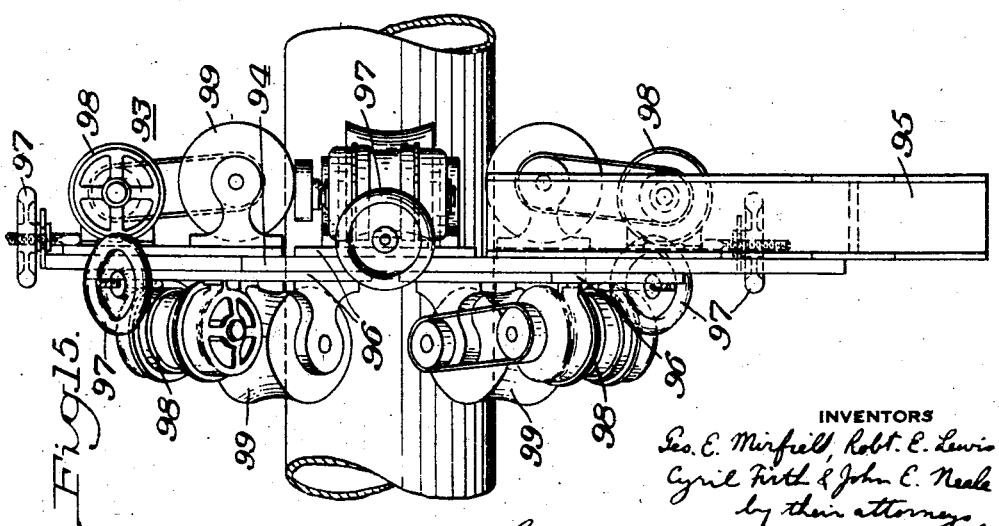

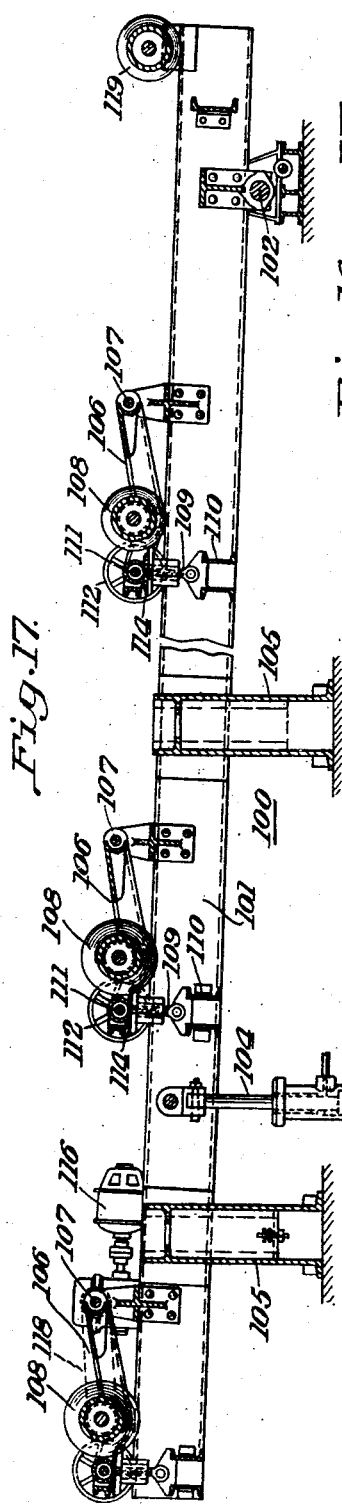

Patented May 28, 1935

2,003,118

UNITED STATES PATENT OFFICE 2,003,118

ELECTRIC WELDING APPARATUS

George E. Mirfield, Robert E. Lewis, and Cyril Firth, Youngstown, and John E. Neale, Girard, Ohio, assignors to The Youngstown Sheet & Tube Company, Youngstown, Ohio, a corporation of Ohio Application March 22, 1933, Serial No. 662,098

18 Claims. (Cl. 29—33)

Our invention relates to electric welding apparatus and, in particular, to apparatus for welding pipe from blanks formed of flat plate bent to tubular shape with an axial seam therein. The invention is applicable, of course, to the manufacture of other welded articles and comprises an efficient arrangement of the several pieces of apparatus, as well as the structural details of the latter.

Mills for the manufacture of welded pipe are very old and well known. The manufacture of pipe by electric welding methods, however, has introduced certain specific problems not heretofore encountered. It is one of the objects of our invention to provide solutions of problems specific to the manufacture of pipe by electric welding methods.

In accordance with our invention, flat plate of appropriate width and thickness is fed through a forming machine which bends the flat plate up into tubular shape with an axial seam cleft between the plate edges. The formed plate is then ready for passage through the welder. It is necessary in practically all types of electric welders that the seam cleft of the blank to be welded have a predetermined position relative to the welder. To effect the desired positioning of the blank, we have provided an approach table which will be described in detail.

After the blank has been adjusted on the approach table, it is sent through the welder and the seam cleft closed and the edges thereof united. We provide mechanism for trimming the metal and oxide from the exterior of the welded seam as the pipe emerges from the welder. We also provide means for abrading the pipe exteriorly to remove scale and dirt therefrom.

It is known that the pipe emerging from an electric welder is apt to be characterized by a considerable camber because of the fact that the welding heat is concentrated at a narrow portion of the pipe circumference, that is, along the seam cleft. We provide tilting tables for receiving the pipe emerging from the welder so that even if it is characterized by a substantial camber, it will be properly supported at all points and will not be permitted to drop heavily when it finally emerges from the welder.

For performing the necessary finishing operations on the pipe, we employ suitable handling tables and skids for passing the pipe successively over an inspection table, a preliminary mending table, a cooling table and a seam grinding machine, to a straightening machine. After passing through the straightener, the pipe is subjected to an end sawing operation and then to a hydraulic pressure test. The details of the various pieces of apparatus of our invention will be described in due course, as well as the arrangement of the various parts on the mill floor.

For a complete understanding of our invention, reference is made to the accompanying drawings illustrating the present preferred embodiment. In the drawings:

Figures 1A, 1B and 1C, when laid side by side, illustrate diagrammatically the mill layout which we prefer to use;

Figures 2A and 2B, taken together, constitute a plan view of the approach table for aligning the seam cleft in the tube blank;

Figures 3A and 3B constitute a side elevation of the approach table;

Figure 4 is a sectional view substantially along the plane of line IV—IV of Figure 2B;

Figure 5 is a similar view taken along the line V—V of Figure 2A;

Figure 6 is a sectional view along the plane of line VI—VI of Figure 3A;

Figure 7 is a sectional view taken along the line VII—VII of Figure 4;

Figure 8 is a side elevation of the welder proper showing the mechanism for trimming the flash bead in section;

Figure 9 is an end elevation of the bead trimmer;

Figure 10 is a partial sectional view along the line X—X of Figure 8 to enlarged scale;

Figure 11 is a similar view along the line XI—XI of Figure 8;

Figure 12 is a view similar to Figure 11 to a small scale illustrating a modified form of the invention;

Figure 13 is a sectional view taken on a plane indicated by the line XIII—XIII of Figure 11;

Figure 14 is an elevation of the pipe cleaning apparatus;

Figure 15 is a side view of the structure shown in Figure 14;

Figure 16 is a partial plan view of the tilting table for receiving pipe from the welder;

Figure 17 is a sectional view along the plane of line XVII—XVII of Figure 16;

Figure 18 is a sectional view along the line XVIII—XVIII of Figure 16; and

Figure 19 is a sectional view with parts in elevation taken along the line XIX—XIX of Figure 16.

Figure 1A:
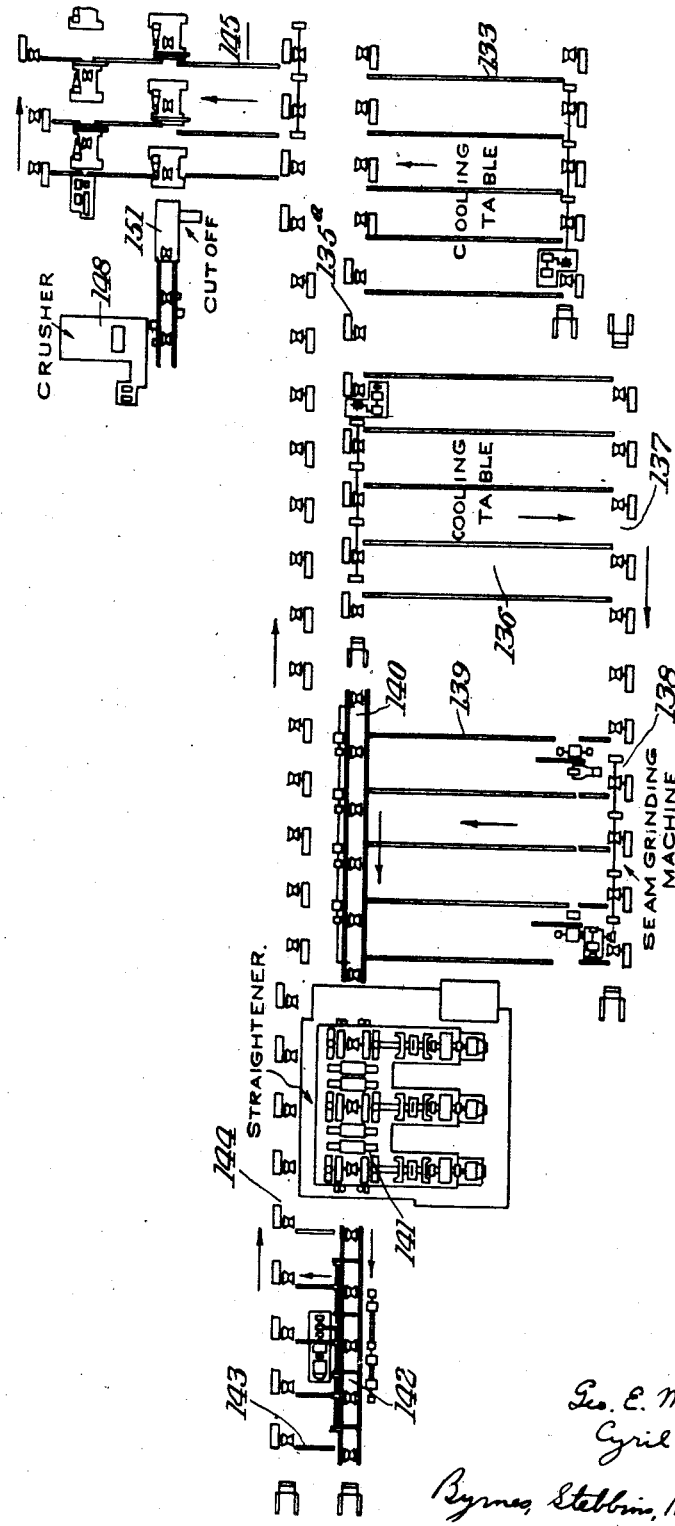

Referring now in detail to the drawings, a plate conveyor 10 of any suitable type supplies plate of the proper gauge and dimensions to a forming machine 11. The forming machine may be of any desired type and is not disclosed in detail since it is not part of our invention. Preferably, it consists of a plurality of roll stands effective for gradually bending up the edges of the flat plate delivered by the conveyor 10 into tubular shape.

The last stand of the forming machine 11 delivers tubular blanks to a run-out conveyor 12 against a stop 13. The conveyor 12 is provided with tilting arms 14 for removing pipe from the conveyor and shifting it sidewise therefrom on to skids 15 or 16 for delivery to approach tables 17 or 18. These tables are substantially identical and are illustrated in detail in Figures 2 through 7.

Referring for the present to the last-mentioned figures, each of the tables 17 and 18 comprises a structural frame 19 supported on suitable bases 20. Rolls 21 are journaled in the frame 19 and are driven by a motor 22 through reduction gearing 23, spur gears 24 and 24ª, a shaft 25 and bevel gears 26.

At spaced points along the frame 19, lifting heads 27 are positioned having rolls 28 journaled therein with their axes perpendicular to those of the rolls 21. The heads 27 are pivoted to pitmen 29 adapted to be actuated by cranks 30 on a shaft 31. The crank shaft 31 is rotatable through a small angle by means of an eccentric 32, a link 33 and a crank 34. The eccentric 32 is driven by a motor 33ª through reducing gearing 34ª. One of the rolls 28 on each of the heads 27 is driven from the shaft 25. Gear boxes 35 and 36 are pivoted together as shown clearly in Figure 7. The gear box 35 is also pivoted on the shaft 25, while the gear box 36 is pivoted on the shaft 28ª of the roll 28. The shaft 28ª is also provided with a pinion 37. A pinion 38 on the shaft 25 drives the pinion 37 through a gear train comprising gears 39, 40 and 41 mounted in the gear boxes 35 and 36, as shown in Figure 7.

The heads 27 are also provided with retractible spring pressed plungers 42. When the heads 27 are raised by operation of the eccentric 32 to lift a pipe indicated in dotted lines at 43 from the rolls 21 of the approach table, the plungers 42 are retracted by engagement with the pipe. The rotation of the pipe resulting from the friction drive of the roll 28 thereon, brings the seam cleft 44 in the pipe blank 43 into alignment with the plungers 42. The latter immediately enter the seam cleft and hold the blank in welding position with the seam cleft on the bottom. When the blank has been positioned, further operation of the eccentric 32 lowers the heads 27, restoring the pipe blank to the rolls 21 and withdrawing the plungers 42 from the seam cleft.

The drive for the rolls 21, including the spur gears 24 and 24ª and a pinion 45, is shown more fully in Figure 5. The gear 24ª is keyed to the shaft 25. The gear 24 is carried on a shaft 47 which is journaled in links 48 and 49. The links 48 are pivoted on the shaft 25 and the links 49 on a shaft 50, to which the pinion 45 is keyed, coupled to the low speed end of the speed reducer 23. This arrangement of the drive for the rolls 21 is for the purpose of permitting vertical adjustment of the table while maintaining the geared connection between the motor 22 and the shaft 25.

The adjusting means for the tables 17 and 18 are shown in Figure 6. The bases 20 may be castings of any convenient dimensions. It will be noted that the members of the frame 19 lie outside the bases and are connected by bolts 51. A pair of cross bars 52 extend across the bottom of the frame 19 and are secured thereto by bolts 53. An adjusting jack or screw 54 is threaded through a nut 55 resting on the base 20. At the lower end of the screw 54 is a key 56 engaging the cross bars 52. The key 56 prevents rotation of the screw when the nut 55 is turned and also transmits the upward thrust of the screw to the frame 19 through the cross bars 52.

Figure 1B:
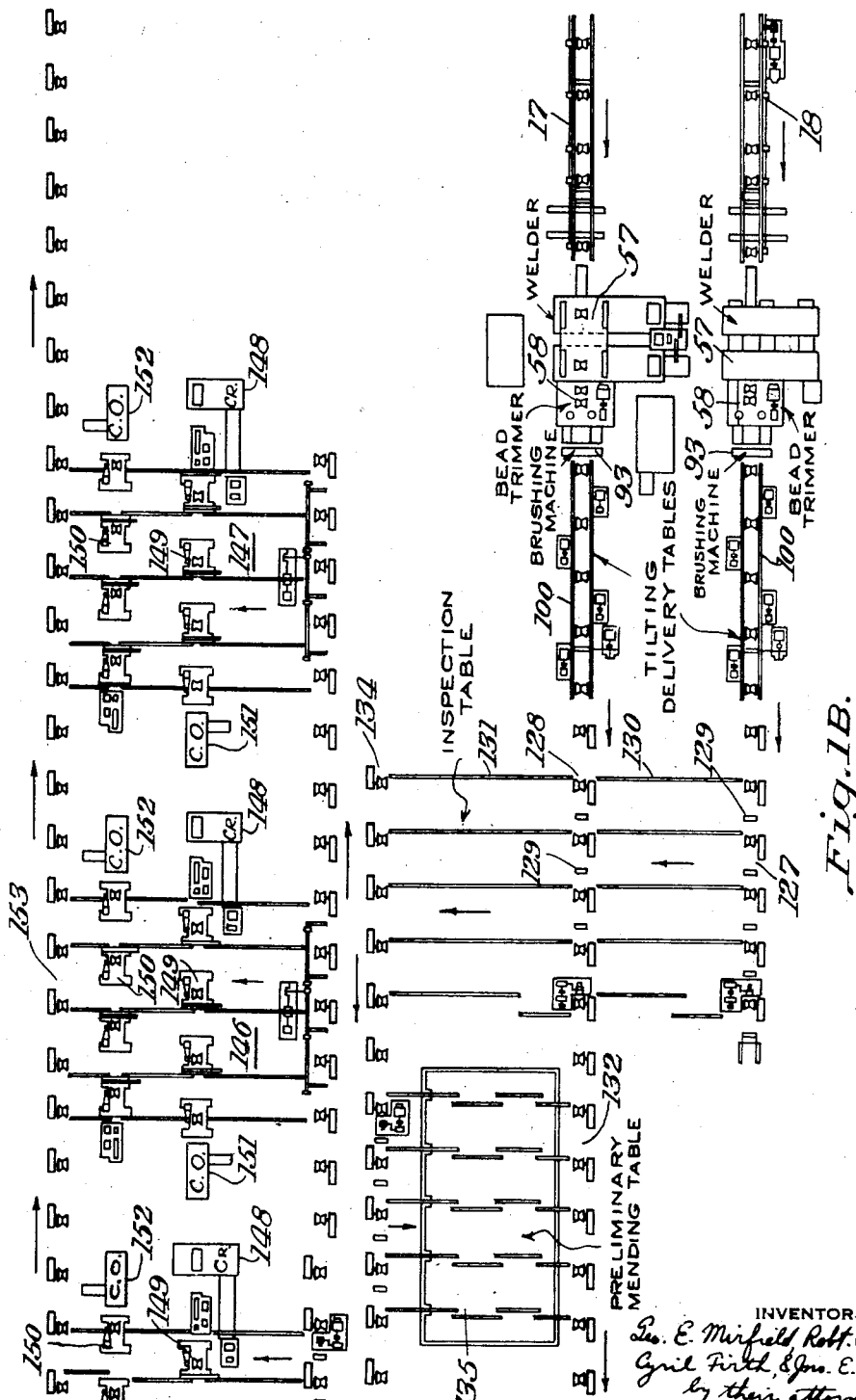

Referring back to Figure 1B for a moment, the welders are shown diagrammatically at 57 and the bead trimmers at 58. These pieces of apparatus are illustrated in detail in Figures 8 and 9, to which further reference will be made. The welders comprise a base 59 having a crushing roll stand 60, a welding roll stand 61 and flash regulating roll stands 62 and 63 thereon. The welders are preferably of the induction type and are provided with a so-called torpedo 64 which extends through the crushing, flash regulating and welding stands in a position to be embraced by the tube blank in passing therethrough. The torpedo is supported from the base 59 by a plate or fin 65 which lies in the seam cleft of the blanks as they pass over the torpedo. The torpedo, of course, embodies a primary inducing coil for generating electromagnetic flux which induces circumferential welding currents in the blank.

The crushing stand 60 is provided with top and bottom rolls 66 and side rolls 67. The top and bottom rolls are substantially similar and have central portions 68 and freely rotatable lateral portions 69. The bottom roll is provided with a fin 70 for entering the seam cleft to insure proper guiding thereof into the welding stand. The lateral portions 69 of the rolls 66, because their diameters differ from that of the central portions 68, rotate at different speeds. This prevents scoring of the blank which has been found to result from the sliding of certain portions of unitary rolls due to the difference in peripheral speed of portions having different diameters. The peripheries of the rolls 66 and 67, furthermore, are relieved slightly, adjacent their edges, as a further precaution against scoring the blank. The flash regulating stands 62 and 63 are provided with a plurality of guides. A top guide 71 has a plurality of rolls 72. Bottom guides 73 engage the edges of the pipe blank adjacent the seam cleft. The setting of the guides on the flash regulating stands may be controlled by adjusting wheels 74 so that the spacing of the edges of the seam cleft while traversing the distance between the crushing and welding stands may be accurately predetermined.

The welding stand 61 is similar in its construction to the crushing stand 60 but the rolls thereof differ in certain respects. The welding rolls are shown in their preferred form in Figure 11. The top and bottom rolls 75 are similar in general to the top and bottom rolls 66 of the crushing stand. Figure 11 shows more specifically the construction of the top and bottom rolls of both stands and their lateral portions which are freely rotatable with respect to the central portion. The bottom roll 75 of the welding stand is provided with a groove 76 to permit the formation of a bead or burr of the metal and oxide extruded from the heated edges of the blank. Additional grooves 77 are provided in the bottom roll of the welding stand. The grooves 77 permit air jets 78 to project along the seam cleft just prior to the welding of the edges thereof. The air jets blow excess molten metal from the heated edges of the cleft and improve the quality of the weld.

In order to keep the grooves 76 and 77 free, we provide scrapers 79 and a blade 80 engaging the grooved surface of the roll. The scrapers and blades are carried in a frame 81 which is pivoted to the base of the welding stand. The frame 81 may be swung out of operating relation to the roll surface by means of a cylinder and piston 82.

A modified form of welding roll construction is shown in Figure 12. The top and side rolls, as shown in Figure 12, are solid. The bottom roll is composed of two portions, 83 and 84. It will be noted that the portion 84 of the roll is seated on a collar extending from the portion 83. Insulation 85 between the two portions of the roll prevents shunting of the welding current through the roll face.

The bead trimmers 58 each comprise a base 86 and a frame 87 supported thereon. Rotary shears 88 are positioned in the frame 87 on opposite sides of the welded seam. Guide rolls 89 for engaging the top of the pipe are carried in a housing 90 slidable in the frame 87 and actuated by adjusting screws 91 and hand wheels 92.

After traversing the welder and the bead trimmer, the pipe is subjected to a cleaning operation in brushing machines 93. The brushing machines 93 comprise a plate 94 carried by uprights 95 set in a suitable foundation. The plate 94 has a single opening for permitting the passage of the welded pipe therethrough. Slide plates 96 are adjustably mounted on the plate 94 and may be moved toward and away from the pipe opening by hand wheels and adjusting screws 97. Each plate 96 is provided with a motor 98 and a rotary cleaning or abrading brush 99. The brush 99 is belted to the motor and when driven thereby, exerts a very effective cleaning action on the exterior of the pipe. It will be observed in Figures 14 and 15 that there are four brushes on each side of the plate 94 symmetrically arranged so that the complete set of eight brushes cover the entire periphery of the pipe.

Tilting delivery tables 100 support the pipe as it emerges from the welders, bead trimmers and brushing machines. We have already mentioned that, because of the camber characterizing the welded pipe, it is desirable to provide means for supporting the leading end of the pipe which rises to an elevation above the center line of the welding pass, while the trailing end of the pipe is being welded. This function is performed by the tilting tables 100, the details of which are illustrated in Figures 17 through 19. Each table comprises a structural frame 101 pivoted on a shaft 102 adjacent the end nearest the welder. A hydraulic cylinder 103 has a piston 104 connected to the frame 101 adjacent its other end for lifting it. Guides 105 extend between the frame 101 for guiding the tilting movement thereof. Spaced along the length of the frame are a plurality of adjustable yokes 106. The yokes are pivoted on shafts 107 and are provided with conveyor rolls 108. A screw 109 pivoted to a cross piece 110 of the frame 101 supports the free end of each yoke 106. A shaft 111 operated by a hand wheel 112 drives a nut 113 in each yoke through bevel gearing 114. A nut 113 is threaded on the screw 109 and operation of the hand wheel 112 thereby results in an adjustment of the angle of the yoke 106 relative to the frame 101.

Adjacent each of the yokes 106, a platform 115 is secured to the frame 101. A motor 116 through reducing gearing 117 and a chain drive 118 drives the roll 108. An idler entrance roll 119 is located at the end of the frame nearest the welder.

In addition to the adjustment of the individual rolls 108 provided by the hand wheels 112, the level of the entrance end of the table may be similarly adjusted. The shaft 102 is provided at its ends with nuts 120 through which adjusting screws 121 are threaded. These screws are journaled in suitable housings 122 and are driven through worm and worm wheel drives 123 from a shaft 124. The shaft 124 is driven through bevel gearing 125 by a hand wheel 126. The elevation of the entrance end of the table will preferably be adjusted to properly support the leading end of a pipe as it emerges from the welder. The yokes 106 will be similarly adjusted to provide the necessary support for the leading end as it progresses along the table. Generally, one adjustment of the table and the individual rolls thereof will be sufficient to accommodate all pipe of the same character welded under similar conditions so that it is not necessary to make adjustments very often.

After the pipe has been delivered to the tilting tables 100, the latter are lowered and the pipe advanced to tables 127 and 128. The pipe is lifted from the tables 127 and 128 by tilting arms 129 and passed over inspection tables 130 and 131. Pipe which appears on inspection to have been satisfactorily welded is conducted along a conveyor table 132 to a cooling table 133. Pipe which appears to require mending to cure minor defects is delivered by a conveyor table 134 to a preliminary mending table 135 consisting of staggered skids which permit workmen to move freely about therein. After crossing the cooling table 133, the pipe is delivered by a conveyor table 135ᵃ to a second cooling table 136 from which it passes to a conveyor table 137.

A seam grinding machine 138 is in line with the conveyor table 137 and the pipe received thereon is subjected to the operation of a traveling grinder to finish the surface of the welded seam. From the seam grinding machine, the pipe passes across a skid table 139 to a conveyor table 140 in line with the rolls of a sizing and straightening machine 141. After passing through the straightening machine, the pipe runs out on a conveyor table 142 and is transferred on skids 143 to a conveyor table 144. The direction of movement of the pipe is now from left to right and it is delivered to one of a plurality of cut-off machines 145, 146 or 147. Here the pipe is cut to length by suitable saws. The cut off ends are subjected to a test crushing in crushing machines 148. It will be observed that each cut-off machine comprises a pair of tables 149 and 150. The cut-off machine 151 is located at one end of the tables 149, the crusher 148 being at the other end. A cut-off machine 152 is located at the end of the table 150 opposite the cut-off machine 151. The cut off ends of the pipe are also finished by beveling and reaming before delivery to a table 153 which conveys the finished pipe to a hydraulic testing machine 154. After passing through the machine 154, the pipe is rolled on to a conveyor table 155 which conveys the pipe to the cutting apparatus and after treatment by the latter, the pipe is ready for loading.

It will be apparent from the foregoing description that the invention provides apparatus for rapidly and continuously welding pipe from formed tube blanks and finishing the welded pipe by subjecting it to a succession of operations. The arrangement of the various pieces of apparatus is such that the material moves through them in a more or less continuous straight line without any back tracking or unnecessary movement. Each of the individual machines, furthermore, effects its intended operation very rapidly and efficiently and are designed to fully meet the requirements of their particular operation.

Certain of the apparatus herein illustrated diagrammatically has not been described in detail for the reason that it is well known and requires no specific description. While we have described the novel apparatus as having a specific construction, it is obvious that numerous changes therein may be made, as well as in the arrangement of the several pieces of apparatus, without departing from the spirit of our invention or the scope of the appended claims.

We claim:

1. The combination with apparatus for welding together the edges of an axial seam cleft in a formed tube blank, of means for effecting a predetermined positioning of the seam cleft relative to the welder including a roll table for moving the blank axially, auxiliary supports for lifting the blank from the table and rotating it, and retractible means for entering the seam cleft upon its arrival at the predetermined position.

2. The combination with apparatus for welding together the edges of an axial seam cleft in a formed tube blank, of means for effecting a predetermined positioning of the seam cleft relative to the welder including a roll table for moving the blank axially, lifting heads having longitudinal rolls for engaging the blank, means for lifting said heads, means for driving the longitudinal rolls to turn the blank, and a retractible plunger for entering the seam cleft when properly positioned.

3. The combination with apparatus for welding together the edges of an axial seam cleft in a formed tube blank, of means for effecting a predetermined positioning of the seam cleft relative to the welder including a roll table for moving the blank axially, lifting heads having longitudinal rolls thereon, pitmen connected to the heads and to cranks on a common shaft, and means for turning said shaft to raise said heads whereby the longitudinal rolls support the blank for rotation about its own axis.

4. The combination with apparatus for welding together the edges of an axial seam cleft in a formed tube blank, of means for effecting a predetermined positioning of the seam cleft relative to the welder including a roll table for moving the blank axially, a shaft for driving the rolls of said roll table, lifting heads between the rolls of the table, longitudinal rolls on said heads, and means for driving at least one of the longitudinal rolls from said shaft.

5. Apparatus for forwarding a formed tube blank to a welder for joining the edges of an axial seam cleft therein, comprising a roll table for supporting and advancing the blank, auxiliary means effective to support the blank above the table for rotation about its own axis, and means for entering said cleft on such rotation to position the blank for movement through the welder.

6. Apparatus for welding together the edges of a seam cleft in a formed tube blank including a stand of rolls for engaging the pipe circumferentially, at least one of said rolls having a central portion, and lateral portions freely rotatable relative thereto.

7. Apparatus for welding together the edges of a seam cleft in a formed tube blank including a stand of rolls for engaging the pipe circumferentially, the rolls having their edges relieved from a truly circular contour to prevent scoring the blank.

8. Apparatus for welding together the edges of a seam cleft in a formed tube blank including a stand of rolls for engaging the pipe circumferentially, one of said rolls being grooved circumferentially, and fluid-blast supply means projecting through said groove toward the heated edges of the seam cleft.

9. The combination with apparatus for welding together the edges of a seam cleft in a tube blank, of means for supporting the tube upon emerging from said apparatus including a roll table pivoted adjacent said apparatus for tilting movement, means for tilting the table, means for adjusting the table vertically, a plurality of conveying rolls on said table, and means for vertically adjusting said rolls individually.

10. The combination with apparatus for welding together the edges of a seam cleft in a tube blank, of means for supporting the tube upon emerging from said apparatus including a roll table pivoted adjacent said apparatus for tilting movement, means for tilting the table, a plurality of conveying rolls on said table, and means for vertically adjusting said rolls individually.

11. The combination with apparatus for welding together the edges of a seam cleft in a tube blank, of means for supporting the tube upon emerging from said apparatus including a roll table pivoted adjacent said apparatus for tilting movement, means for tilting the table, means for adjusting the table vertically, and a plurality of conveying rolls on said table.

12. The combination with apparatus for welding together the edges of a seam cleft in a tube blank, of means for supporting the tube upon emerging from said apparatus including a roll table having a plurality of yokes thereon for tilting movement, conveying rolls journaled in said yokes, and means for individually adjusting the tilting yokes.

13. In a tube welding mill, the combination with a welder for closing an axial seam in a formed tube blank, and forming means for making the blank from flat plate, of means between the welder and forming means for rotating a blank about its axis to position the seam cleft, and means for holding the blank in position when rotated thereto.

14. In a tube welding mill, the combination with a welder for closing an axial seam in a formed tube blank, and forming means for making the blank from flat plate, of means between the welder and forming means for rotating a blank about its axis to position the seam cleft.

15. In a tube welding mill, the combination with a welder for closing an axial seam in a formed tube blank, and means for delivering a blank thereto, of a tilting table on the exit side of the welder for supporting an emerging pipe at spaced points regardless of vertical cambering thereof.

16. In a welder, the combination with a grooved work-engaging roll, of a pivoted cleaning tool rotatable into a position such that it extends into the roll groove, and power means for actuating said tool to or from groove-entering position.

17. In a welder, the combination with a work-engaging roll, of a scraper for engaging the roll face, a pivotal support therefor and resilient abutments yieldingly opposing angular movement of the scraper on the support, and power means for actuating said scraper to or from roll contacting position.

18. In a pipe welding mill, the combination with a welder for closing an axial seam in a formed tube blank, and means for delivering a blank thereto, of means on the exit side of the welder and extending along the discharge path therefrom for supporting the emerging pipe, the end of said means remote from the welder being movable to a level above that of the portion of the pipe in the welder.

GEORGE E. MIRFIELD.
ROBERT E. LEWIS.
CYRIL FIRTH.
JOHN E. NEALE.